(12) United States Patent
Yaguchi et al.

(10) Patent No.: US 8,960,132 B2
(45) Date of Patent: Feb. 24, 2015

(54) VEHICLE AND CONTROL METHOD FOR VEHICLE

(75) Inventors: Hideaki Yaguchi, Toyota (JP); Takeshi Hoshiba, Anjo (JP); Akihiro Kimura, Toyota (JP); Masahiro Naito, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/979,043

(22) PCT Filed: Jan. 27, 2011

(86) PCT No.: PCT/JP2011/051580
§ 371 (c)(1),
(2), (4) Date: Jul. 10, 2013

(87) PCT Pub. No.: WO2012/101801
PCT Pub. Date: Aug. 2, 2012

(65) Prior Publication Data
US 2013/0276725 A1    Oct. 24, 2013

(51) Int. Cl.
*F02B 63/00* (2006.01)
*F02B 63/04* (2006.01)
*B60K 6/445* (2007.10)
*B60W 10/06* (2006.01)
*B60W 20/00* (2006.01)

(52) U.S. Cl.
CPC ............. *F02B 63/04* (2013.01); *B60K 6/445* (2013.01); *B60W 10/06* (2013.01); *B60W 20/00* (2013.01); *B60W 2540/06* (2013.01); *Y02T 10/6239* (2013.01)

USPC ............ 123/2; 477/3; 477/5; 701/22; 701/54; 180/65.265

(58) Field of Classification Search
USPC ....... 123/2; 701/22, 54; 477/3, 5; 180/65.265
See application file for complete search history.

(56) References Cited

U.S. PATENT DOCUMENTS

| | | | |
|---|---|---|---|
| 6,785,603 B2 * | 8/2004 | Inoue | 701/112 |
| 7,242,159 B2 * | 7/2007 | Ishikawa et al. | 318/139 |
| 7,588,013 B2 * | 9/2009 | Ichimoto | 123/347 |
| 2007/0235006 A1 * | 10/2007 | Nishigaki et al. | 123/339.1 |
| 2008/0227590 A1 * | 9/2008 | Kimura et al. | 477/3 |
| 2009/0157283 A1 * | 6/2009 | Fuwa et al. | 701/112 |
| 2010/0312427 A1 * | 12/2010 | Ueno | 701/22 |

FOREIGN PATENT DOCUMENTS

| | | |
|---|---|---|
| JP | A-11-208430 | 8/1999 |
| JP | A-2004-174109 | 6/2004 |
| JP | A-2007-023919 | 2/2007 |
| JP | A-2007-076460 | 3/2007 |
| JP | A-2007-216833 | 8/2007 |

\* cited by examiner

*Primary Examiner* — Marguerite McMahon
*Assistant Examiner* — James Kim
(74) *Attorney, Agent, or Firm* — Oliff PLC

(57) ABSTRACT

An ECU executes a program including the steps of carrying out low-load control when an IG OFF operation is performed, when a vehicle is running, and when stop of an engine is not permitted, carrying out gate cut-off control, ending low-load control and gate cut-off control when a brake pedal has been operated, when a vehicle speed is lower than a threshold value, or when a prescribed time period has elapsed since the IG OFF operation, permitting stop of the engine, and carrying out fuel cut control.

9 Claims, 5 Drawing Sheets

(12) United States Patent

VEHICLE AND CONTROL METHOD FOR VEHICLE

TECHNICAL FIELD

The present invention relates to control of a vehicle incorporating a rotating electric machine and an internal combustion engine.

BACKGROUND ART

According to an engine start control system disclosed in Japanese Patent Laying-Open No. 2007-23919 (PTL 1), a technique for re-starting an engine when a push switch is pressed in spite of absence of pressing down of a brake pedal in the case where the engine stops because of some factor during running of a vehicle is disclosed.

In addition, a hybrid car incorporating a motor generator and an engine has recently attracted attention as one of measures to address environmental issues.

CITATION LIST

Patent Literature

PTL 1: Japanese Patent Laying-Open No. 2007-23919

SUMMARY OF INVENTION

Technical Problem

In the hybrid car as described above, when an engine stops because of some factor during running at a high speed, there is a possibility that the engine cannot immediately be re-started. This is because start of the engine with the use of the motor generator during running of the vehicle may accompany power generation by or discharge from a motor generator. When allowed input or output electric power is restricted depending on a state of a power storage device, actuation of the motor generator accompanying power generation or discharge is restricted. Therefore, there is a possibility that the engine cannot immediately be re-started.

Regarding the engine start control system disclosed in the publication described above, such a problem is not at all considered and the problem cannot be solved.

An object of the present invention is to provide a vehicle and a control method for vehicle, for controlling an engine to a restartable state when an engine stop instruction is received during running at a high speed.

Solution to Problem

A vehicle according to one aspect of this invention includes a drive wheel, an internal combustion engine, a first rotating electric machine, a power transmission device for connecting the drive wheel, the internal combustion engine, and the first rotating electric machine to one another and transmitting motive power from at least any one of the internal combustion engine and the first rotating electric machine to the drive wheel, an input portion for receiving an instruction for stopping a system of the vehicle from a driver, and a control unit for carrying out as stop control for stopping the internal combustion engine, control for stopping fuel supply to the internal combustion engine in response to the instruction for stopping from the input portion while the internal combustion engine is operating. The control unit delays start of the stop control in a case where the input portion has received the instruction for stopping during running of the vehicle, as compared with a case where the input portion receives the instruction for stopping while the vehicle remains stopped.

Preferably, the control unit carries out as stop control, control for stopping fuel supply to the internal combustion engine when the input portion has received the instruction for stopping.

Further preferably, the control unit carries out first control for setting the internal combustion engine to a low-load operation state and such second control that the power transmission device does not transmit motive power from the internal combustion engine to the drive wheel when the vehicle is in such a state that it cannot permit stop of the internal combustion engine in a case where the input portion has received the instruction for stopping.

Further preferably, the control unit continues the first control and the second control until a prescribed period elapses after reception of the instruction for stopping by the input portion.

Further preferably, the control unit determines that the vehicle is in the state that it cannot permit stop of the internal combustion engine when a speed of the vehicle is higher than a threshold value.

Further preferably, the vehicle further includes a power storage device for supplying and receiving electric power to and from the first rotating electric machine. The control unit determines that the vehicle is in the state that it cannot permit stop of the internal combustion engine when state of charge of the power storage device is lower than a threshold value.

Further preferably, the vehicle further includes a power storage device for supplying and receiving electric power to and from the first rotating electric machine. The control unit determines that the vehicle is in the state that it cannot permit stop of the internal combustion engine when input electric power allowed in the power storage device is lower than a threshold value.

Further preferably, the vehicle further includes a power storage device for supplying and receiving electric power to and from the first rotating electric machine. The control unit determines that the vehicle is in the state that it cannot permit stop of the internal combustion engine when output electric power allowed in the power storage device is lower than a threshold value.

Further preferably, the vehicle further includes a drive shaft for rotating the drive wheel. The power transmission device allows, by mechanically coupling three elements of the drive shaft, an output shaft of the internal combustion engine, and a rotation shaft of the first rotating electric machine and setting any one of the three elements as a reaction force element, transmission of motive power between two other elements. In order for the power transmission device not to transmit motive power from the internal combustion engine to the drive wheel, the control unit controls the first rotating electric machine such that the first rotating electric machine is set to an input and output disabled state.

Further preferably, the vehicle further includes a second rotating electric machine. The control unit controls the second rotating electric machine such that the first rotating electric machine is set to the input and output disabled state and the second rotating electric machine is set to the input and output disabled state.

A control method for vehicle according to another aspect of this invention is a control method for vehicle used for a vehicle including a drive wheel, an internal combustion engine, a first rotating electric machine, and a power transmission device for connecting the drive wheel, the internal combustion engine, and the first rotating electric machine to one another and transmitting motive power from at least any one of the internal combustion engine and the first rotating electric machine to the drive wheel. This control method for vehicle includes the steps of determining whether or not an instruction for stopping a system of the vehicle has been received from a driver and delaying start of stop control for stopping the internal combustion engine in a case where the instruction for stopping has been received during running of the vehicle while the internal combustion engine is operating, as compared with a case where the instruction for stopping is received while the vehicle remains stopped. The stop control includes control for stopping fuel supply to the internal combustion engine.

Advantageous Effects of Invention

According to this invention, when a stop instruction is received during running of a vehicle, start of control for stopping an internal combustion engine is delayed as compared with a case where the vehicle remains stopped. Thus, when an activation instruction is received after reception of the stop instruction, a state of the internal combustion engine can quickly be changed to a driver's intended state. Therefore, a vehicle and a control method for vehicle for controlling an engine to a restartable state in the case where an instruction for stopping the engine is received during running at a high speed can be provided.

DESCRIPTION OF EMBODIMENTS

Figure 1:
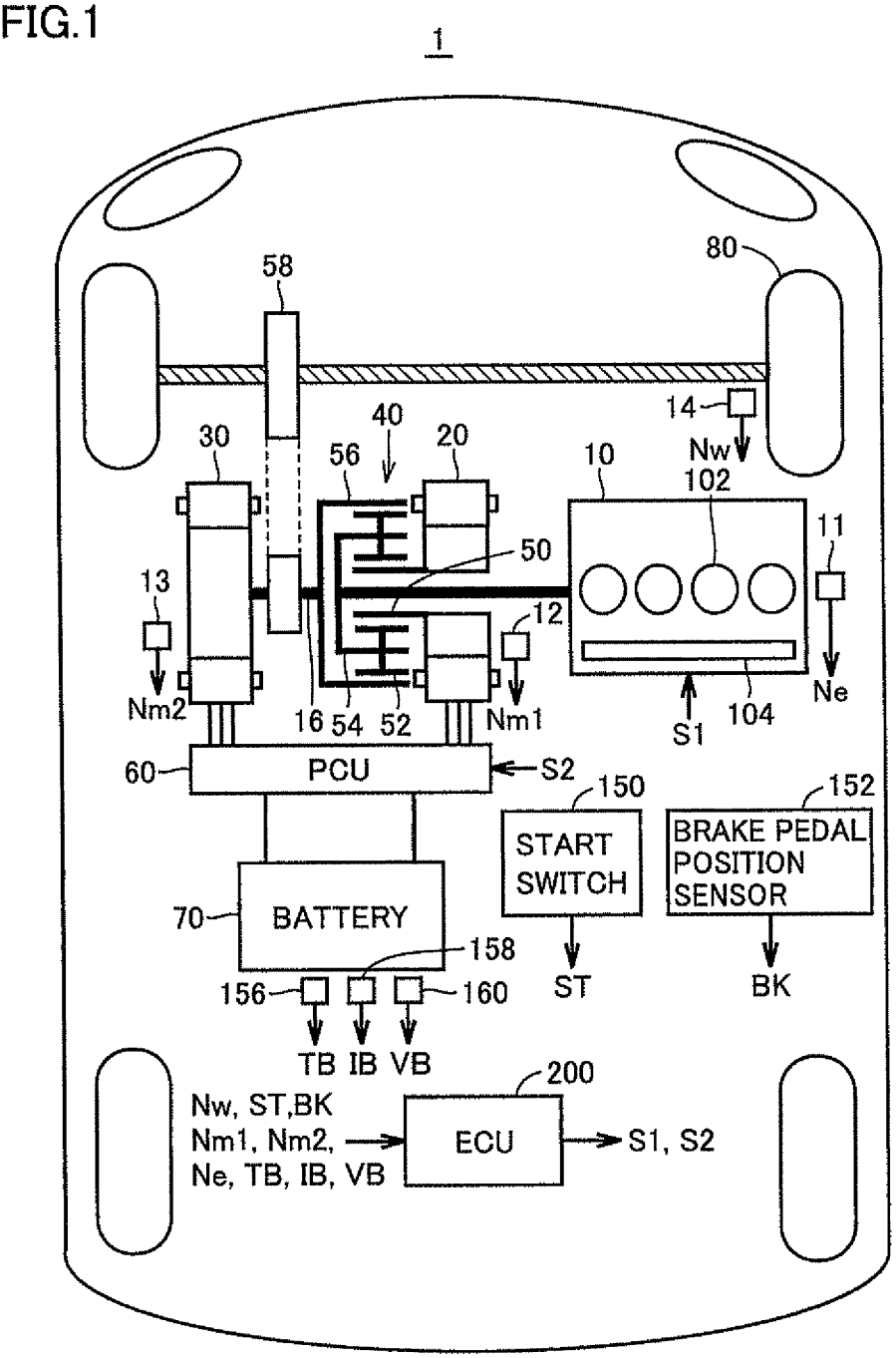
FIG. 1 is an overall block diagram of a vehicle according to the present embodiment.

An embodiment of the present invention will be described hereinafter with reference to the drawings. In the description below, the same elements have the same reference characters allotted. Their label and function are also identical. Therefore, detailed description thereof will not be repeated.

An overall block diagram of a vehicle 1 according to the present embodiment will be described with reference to FIG. 1. Vehicle 1 includes an engine 10, a drive shaft 16, a first motor generator (hereinafter denoted as a first MG) 20, a second motor generator (hereinafter denoted as a second MG) 30, a power split device 40, a reduction gear 58, a PCU (Power Control Unit) 60, a battery 70, a drive wheel 80, a start switch 150, a brake pedal position sensor 152, and an ECU (Electronic Control Unit) 200.

This vehicle 1 runs with driving force output from at least one of engine 10 and second MG 30. Motive power generated by engine 10 is split into two paths by power split device 40. One path of the two paths is a path for transmission to drive wheel 80 through reduction gear 58, and the other path is a path for transmission to first MG 20.

First MG 20 and second MG 30 are each implemented, for example, by a three-phase AC rotating electric machine. First MG 20 and second MG 30 are driven by PCU 60.

First MG 20 has a function as a generator for generating electric power with motive power of engine 10 split by power split device 40 and for charging battery 70 with electric power through PCU 60. In addition, first MG 20 rotates a crankshaft which is an output shaft of engine 10, upon receiving electric power from battery 70. Thus, first MG 20 has a function as a starter for starting engine 10.

Second MG 30 has a function as a drive motor for providing driving force to drive wheel 80 by using at least any one of electric power stored in battery 70 and electric power generated by first MG 20. In addition, second MG 30 has a function as a generator for charging battery 70 through PCU 60 with electric power generated through regenerative braking.

Engine 10 is, for example, such an internal combustion engine as a gasoline engine or a diesel engine. Engine 10 includes a plurality of cylinders 102 and a fuel injector 104 for supplying fuel to each of the plurality of cylinders 102. Fuel injector 104 injects an appropriate amount of fuel at appropriate timing to each cylinder or stops injection of fuel to each cylinder based on a control signal S1 from ECU 200.

Engine 10 is further provided with an engine rotation speed sensor 11 for detecting a rotation speed Ne of a crankshaft of engine 10 (hereinafter denoted as an engine rotation speed). Engine rotation speed sensor 11 transmits a signal indicating detected engine rotation speed Ne to ECU 200.

Power split device 40 mechanically couples three elements of drive shaft 16 for rotating drive wheel 80, the output shaft of engine 10, and a rotation shaft of first MG 20 to one another. Power split device 40 allows, by setting any one of the three elements described above as a reaction force element, transmission of motive power between two other elements. A rotation shaft of second MG 30 is coupled to drive shaft 16.

Power split device 40 is a planetary gear mechanism including a sun gear 50, a pinion gear 52, a carrier 54, and a ring gear 56. Pinion gear 52 engages with each of sun gear 50 and ring gear 56. Carrier 54 rotatably supports pinion gear 52 and it is coupled to the crankshaft of engine 10. Sun gear 50 is coupled to the rotation shaft of first MG 20. Ring gear 56 is coupled to the rotation shaft of second MG 30 and reduction gear 58 with drive shaft 16 being interposed.

Reduction gear 58 transmits motive power from power split device 40 or second MG 30 to drive wheel 80. In addition, reduction gear 58 transmits reaction force from a road surface received by drive wheel 80 to power split device 40 or second MG 30.

PCU 60 converts DC power stored in battery 70 into AC power for driving first MG 20 and second MG 30. PCU 60 includes a converter and an inverter (neither of which is shown) controlled based on a control signal S2 from ECU 200. The converter steps up a voltage of DC power received from battery 70 and outputs the resultant voltage to the inverter. The inverter converts DC power output by the converter to AC power and outputs the resultant AC power to first MG 20 and/or second MG 30. Thus, first MG 20 and/or second MG 30 is/are driven by electric power stored in battery 70. In addition, the inverter converts AC power generated by first MG 20 and/or second MG 30 into DC power and outputs the resultant DC power to the converter. The converter steps down a voltage of the DC power output by the inverter and outputs the resultant voltage to battery 70. Thus, battery 70 is charged with electric power generated by first MG 20 and/or second MG 30. It is noted that it is not necessary to provide a converter.

Battery 70 is a power storage device and it is a rechargeable DC power supply. For example, such a secondary battery as a nickel metal hydride battery or a lithium ion battery is employed as battery 70. A voltage of battery 70 is, for example, approximately 200 V. As described above, battery 70 is charged with electric power generated by first MG 20 and/or second MG 30 and it may be charged with electric power supplied from an external power supply (not shown). It is noted that battery 70 is not limited to a secondary battery and it may be a component capable of generating a DC voltage, such as a capacitor, a solar cell, and a fuel cell.

Battery 70 is provided with a battery temperature sensor 156 for detecting a battery temperature TB of battery 70, a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push-type switch. Start switch 150 may be such a switch that a key is inserted in a key cylinder and turned to a prescribed position. Start switch 150 is connected to ECU 200. In response to a driver's operation of start switch 150, start switch 150 transmits a signal ST to ECU 200.

For example, when ECU 200 receives signal ST while a system of vehicle 1 has stopped, ECU 200 determines that it has received an activation instruction and causes the system of vehicle 1 to make transition from a stop state to an active state. Alternatively, when ECU 200 receives signal ST while the system of vehicle 1 is in an active state, ECU 200 determines that it has received a stop instruction and causes the system of vehicle 1 to make transition from the active state to the stop state. In the description below, a driver's operation of start switch 150 while the system of vehicle 1 is in the active state is referred to as an IG OFF operation, and a driver's operation of start switch 150 while the system of vehicle 1 is in the stop state is referred to as an IG ON operation. When the system of vehicle 1 makes transition to the active state, electric power is supplied to a plurality of pieces of equipment necessary for vehicle 1 to run or the like and the plurality of pieces of equipment are set to an operable state. On the other hand, when the system of vehicle 1 makes transition to the stop state, supply of electric power to some of the plurality of pieces of equipment necessary for vehicle 1 to run is stopped or the like and some of the plurality of pieces of equipment are set to an operation stop state.

A first resolver 12 detects a rotation speed Nm1 of first MG 20. First resolver 12 transmits a signal indicating detected rotation speed Nm1 to ECU 200. A second resolver 13 detects a rotation speed Nm2 of second MG 30. Second resolver 13 transmits a signal indicating a detected rotation speed Nm2 to ECU 200.

A wheel speed sensor 14 detects a rotation speed Nw of drive wheel 80. Wheel speed sensor 14 transmits a signal indicating detected rotation speed Nw to ECU 200. ECU 200 calculates a speed of vehicle 1 (hereinafter also denoted as a vehicle speed) V based on received rotation speed Nw. It is noted that ECU 200 may calculate vehicle speed V based on rotation speed Nm2 of second MG 30 instead of rotation speed Nw.

Brake pedal position sensor 152 detects a brake pedal position BK. Brake pedal position sensor 152 transmits a signal indicating brake pedal position BK to ECU 200. It is noted that a brake pressing force sensor for detecting force with which the brake pedal is pressed may be employed instead of brake pedal position sensor 152 for detecting a brake pedal position.

ECU 200 generates control signal S1 for controlling engine 10 and outputs generated control signal S1 to engine 10. In addition, ECU 200 generates control signal S2 for controlling PCU 60 and outputs generated control signal S2 to PCU 60.

By controlling engine 10, PCU 60, and the like, ECU 200 controls the entire hybrid system, that is, a state of charge and discharge of battery 70, and an operation state of engine 10, first MG 20, and second MG 30, such that vehicle 1 can most efficiently operate.

ECU 200 calculates requested driving force corresponding to an amount of pressing-down of an accelerator pedal (not shown) provided in a driver's seat. ECU 200 controls torque of first MG 20 and second MG 30 and output of engine 10 in accordance with calculated requested driving force.

In vehicle 1 having the features as described above, when efficiency of engine 10 is bad at the time of start, during running at a low speed, or the like, running only with second MG 30 is carried out. Alternatively, during normal running, for example, power split device 40 splits motive power of engine 10 into two paths for motive power. Drive wheel 80 is directly driven by one motive power. Electric power is generated by driving first MG 20 with the other motive power. Here, ECU 200 causes second MG 30 to drive with the use of generated electric power. By thus driving second MG 30, drive of drive wheel 80 is assisted.

During deceleration of vehicle 1, second MG 30 following rotation of drive wheel 80 functions as a generator so that regenerative braking is carried out. Electric power recovered in regenerative braking is stored in battery 70. It is noted that ECU 200 increases an amount of electric power generated by first MG 20 by increasing output of engine 10 in the case where a remaining capacity of the power storage device (in the description below, denoted as SOC (State of Charge)) has lowered and charging is particularly required. SOC of battery 70 is thus raised. In addition, ECU 200 may carry out control for increasing driving force from engine 10 as necessary, even during running at a low speed. For example, a case where charging of battery 70 is required as described above, a case where auxiliary machinery such as an air-conditioner is driven, a case where a temperature of a coolant for engine 10 is raised to a prescribed temperature, and the like are exemplified.

In controlling an amount of charging of battery 70 and an amount of discharge therefrom, ECU 200 sets input electric power allowed during charging of battery 70 (in the description below, denoted as "charge power upper limit Win") and output electric power allowed during discharging from battery 70 (in the description below, denoted as "discharge power upper limit Wout") based on battery temperature TB and current SOC. For example, as the current SOC lowers, discharge power upper limit Wout is set to gradually lower. On the other hand, as the current SOC is higher, charge power upper limit Win is set to gradually lower.

A secondary battery employed as battery 70 has such temperature dependence that internal resistance increases when the temperature is low. When the temperature is high, excessive increase in temperature due to further heat generation should be prevented. Therefore, when battery temperature TB is low and high, each of discharge power upper limit Wout and charge power upper limit Win is preferably lowered. ECU 200 sets charge power upper limit Win and discharge power upper limit Wout, for example, by using a map or the like, in accordance with battery temperature TB and current SOC.

In addition, ECU 200 carries out stop control for stopping engine 10 in response to a stop instruction from start switch 150 while engine 10 is operating. In the present embodiment, it is assumed that stop control refers to fuel cut control for stopping fuel supply to engine 10. It is noted that ECU 200 may carry out as stop control, control which is combination of fuel cut control with such control that engine rotation speed Ne does not attain to zero by using first MG 20.

In vehicle 1 having the features described above, when engine 10 stops because of some factor during running at a high speed, there is a case that the engine cannot immediately be re-started. For example, as shown with a solid line in a nomographic chart in FIG. 2, a case where vehicle 1 runs at a high speed is assumed.

Figure 2:
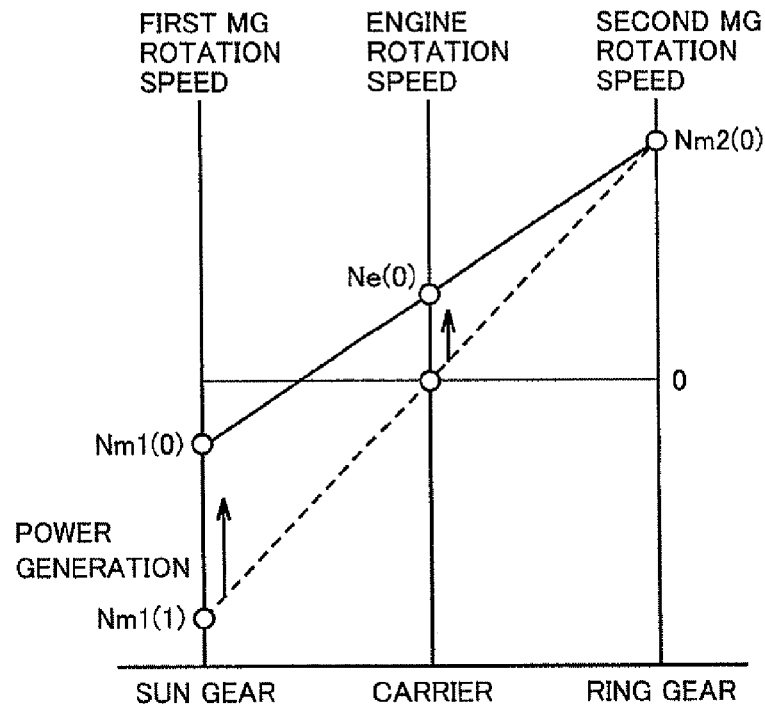
FIG. 2 is a nomographic chart for illustrating an operation of the vehicle in the present embodiment.

It is noted that a vertical axis on the left among three vertical axes in the nomographic chart shown in FIG. 2 represents a rotation speed of sun gear 50, that is, rotation speed Nm1 of first MG 20. In addition, a central vertical axis in the nomographic chart shown in FIG. 2 represents a rotation speed of carrier 54, that is, engine rotation speed Ne. Moreover, a vertical axis on the right in the nomographic chart shown in FIG. 2 represents a rotation speed of ring gear 56, that is, rotation speed Nm2 of second MG 30. It is noted that a direction shown with an arrow along each vertical axis in the nomographic chart in FIG. 2 indicates a positive rotation direction and a direction reverse to the direction shown with the arrow indicates a negative rotation direction.

During running of vehicle 1, rotation speed Nm1 of first MG 20, engine rotation speed Ne, and rotation speed Nm2 of second MG 30 vary such that rotation speeds Nm1, Ne, Nm2 of respective elements maintain relation connected to one another through one straight line in the nomographic chart in FIG. 2.

As shown with the solid line in FIG. 2, it is assumed that rotation speed Nm1 of first MG 20 is set to Nm1(0), engine rotation speed Ne is set to Ne(0), and rotation speed Nm2 of second MG 30 is set to Nm2(0).

When rotation of engine 10 is stopped in the case where an IG OFF operation is performed during running of vehicle 1 at a high speed, vehicle 1 enters a state shown with a dashed line in FIG. 2. Here, a case where engine 10 is started by using first MG 20 is assumed. In this case, engine rotation speed Ne should become higher than a lowest engine rotation speed at which first explosion can take place, by raising rotation speed Nm1 of first MG 20 from Nm1(1) to Nm1(0).

Therefore, torque in the positive rotation direction opposite to a rotation direction (negative rotation direction) of first MG 20 should be generated. In a process for increasing the rotation speed of first MG 20 from Nm1(1) to Nm1(0), however, first MG 20 generates electric power. Therefore, when charging is restricted due to the fact that SOC of battery 70 is higher than a normal SOC range, that is, when charge power upper limit Win is lower than in the case where SOC is within the normal SOC range, there may be a case that power generation by first MG 20 cannot be carried out. Therefore, there may be a case that the engine cannot immediately be re-started.

Then, the present embodiment is characterized in that ECU 200 delays start of stop control in the case where start switch 150 has received a stop instruction during running of vehicle 1 while engine 10 is operating, as compared with the case where start switch 150 receives a stop instruction while vehicle 1 remains stopped. In particular, when ECU 200 cannot permit stop of engine 10 in the case where start switch 150 has received the stop instruction during running of vehicle 1 while engine 10 is operating, ECU 200 delays start of stop control, as compared with the case where start switch 150 receives the stop instruction while vehicle 1 remains stopped.

Figure 3:
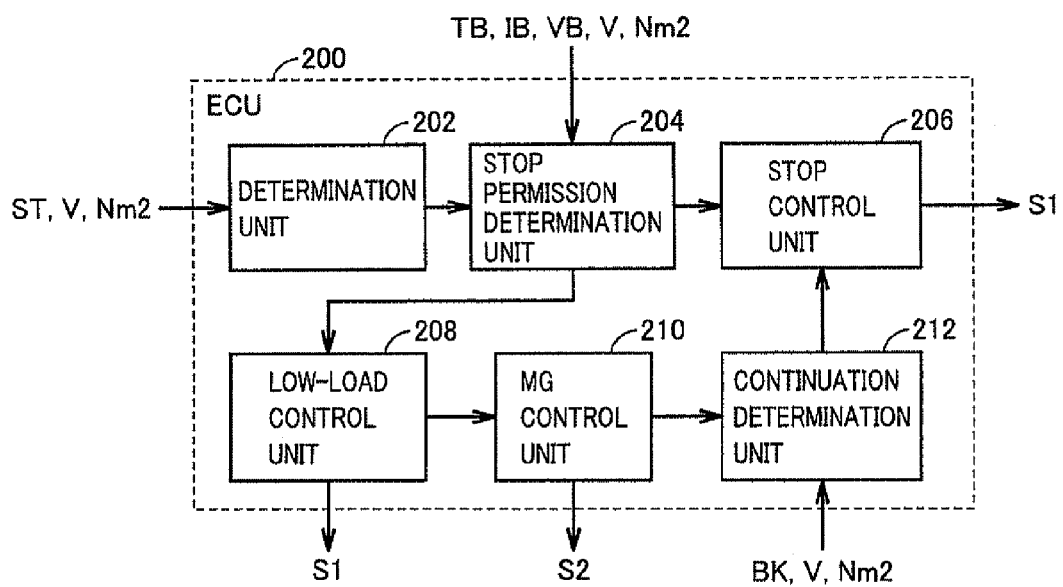
FIG. 3 is a functional block diagram of an ECU mounted on the vehicle according to the present embodiment.

FIG. 3 shows a functional block diagram of ECU 200 mounted on vehicle 1 according to the present embodiment. ECU 200 includes a determination unit 202, a stop permission determination unit 204, a stop control unit 206, a low-load control unit 208, an MG control unit 210, and a continuation determination unit 212.

Determination unit 202 determines whether or not an IG OFF operation has been performed. When signal ST is received from start switch 150 with a system of vehicle 1 being active, determination unit 202 determines that the IG OFF operation has been performed. It is noted that determination unit 202 may turn on an IG OFF determination flag, for example, when the IG OFF operation is performed.

In addition, determination unit 202 determines whether or not vehicle 1 is running. When vehicle speed V is higher than a prescribed vehicle speed V(0), determination unit 202 determines that vehicle 1 is running. It is noted that determination unit 202 may turn on a running determination flag when vehicle 1 is determined as running. Though prescribed vehicle speed V(0) is not particularly limited so long as it is a vehicle speed at which vehicle 1 can be determined as running, for example, it is a vehicle speed at the time when vehicle 1 substantially stops.

When an IG OFF operation is performed during running of vehicle 1, stop permission determination unit 204 determines whether or not vehicle 1 is in such a state that it can permit stop of engine 10. Specifically, when vehicle speed V is higher than a threshold value V(1), stop permission determination unit 204 may determine that stop of engine 10 is not permitted (that is, prohibited). When vehicle speed V is equal to or lower than the threshold value, stop permission determination unit 204 may determine that stop of engine 10 is permitted. It is noted that threshold value V(1) is a value at least higher than threshold value V(0).

Alternatively, when SOC of battery 70 is lower than a threshold value SOC(0), stop permission determination unit 204 may determine that stop of engine 10 is not permitted. When SOC of battery 70 is equal to or higher than threshold value SOC(0), stop permission determination unit 204 may determine that stop of engine 10 is permitted. Threshold value SOC(0) is a criterion value for determining whether or not first MG 20 should generate electric power by using motive power from engine 10. Namely, when SOC of battery 70 is lower than threshold value SOC(0), power generation using motive power from engine 10 is required and thus it is determined that stop of engine 10 is not permitted.

Alternatively, when input electric power allowed in battery 70 (that is, charge power upper limit Win) is lower than a threshold value Win(0), stop permission determination unit 204 may determine that stop of engine 10 is not permitted. When charge power upper limit Win is equal to or higher than threshold value Win(0), stop permission determination unit 204 may determine that stop of engine 10 is permitted. For example, a value smaller than a maximum value for input electric power of battery 70 which is achieved by power generation by first MG 20 at the time of re-start of engine 10 with the use of first MG 20 is set as threshold value Win(0). It is noted that threshold value Win(0) may be, for example, a value varying in accordance with vehicle speed V.

It is noted that stop permission determination unit 204 estimates SOC based on battery temperature TB, current IB, and voltage VB. For example, stop permission determination unit 204 estimates internal resistance having characteristics dependent on battery temperature TB, based on battery temperature TB. Stop permission determination unit 204 estimates an open circuit voltage (OCV) based on the estimated internal resistance as well as on current IB and voltage VB. Stop permission determination unit 204 estimates SOC based on the estimated open circuit voltage. It is noted that a method of estimating SOC described above is by way of example, and SOC of battery 70 may be estimated with other known techniques (for example, summation of amounts of charging and discharging or the like).

For example, when stop of engine 10 is permitted, stop permission determination unit 204 may turn on a permission determination flag.

When stop permission determination unit 204 determines that stop of engine 10 is permitted or when continuation determination unit 212 which will be described later determines that a coasting state of vehicle 1 is not to be continued, stop control unit 206 carries out fuel cut control for stopping fuel injection into cylinder 102. Stop control unit 206 generates control signal S1 indicating that fuel cut control be carried out and transmits generated control signal S1 to engine 10. It is noted that, for example, when a stop permission flag is ON, stop control unit 206 may carry out fuel cut control. Alternatively, stop control unit 206 may stop fuel injection into cylinder 102 by not transmitting control signal S1 to engine 10.

When the IG OFF operation is performed, when vehicle 1 is not running (that is, vehicle 1 remains stopped), and when engine 10 is operating, stop control unit 206 controls engine 10 such that engine 10 enters a stopped state by immediately stopping fuel supply to engine 10.

When stop permission determination unit 204 determines that stop of engine 10 is not permitted, low-load control unit 208 carries out low-load control. Low-load control unit 208 carries out as low-load control, control of engine 10 such that engine 10 enters a low-load operation state. Low-load control unit 208 generates control signal S1 for carrying out low-load control and transmits generated control signal S1 to engine 10. It is noted that, for example, when the stop permission flag is OFF, low-load control unit 208 may carry out low-load control.

Here, the low-load operation state of engine 10 refers, for example, to such a state that engine 10 performs self-sustained operation by providing minimum necessary output for continuing operation. It is noted that the low-load operation state of engine 10 may refer to an idling state of engine 10.

MG control unit 210 controls each of first MG 20 and second MG 30 such that each of first MG 20 and second MG 30 is in an input and output disabled state. For example, MG control unit 210 outputs a gate cut-off command to an inverter connected to first MG 20 and an inverter connected to second MG 30, in connection with PCU 60. When the gate of the inverter connected to first MG 20 and the gate of the inverter connected to second MG 30 are cut off (that is, a switching element is OFF) in response to the gate cut-off command, each of first MG 20 and second MG 30 enters a state where torque is not generated, that is, the input and output disabled state. Here, vehicle 1 is in the coasting state.

Continuation determination unit 212 determines whether or not the coasting state of vehicle 1, which results from the fact that engine 10 is in the low-load operation state and first MG 20 and second MG 30 are in the input and output disabled state, is to be continued.

Specifically, continuation determination unit 212 determines that the coasting state of vehicle 1 is to be continued when the driver is not operating the brake pedal, when vehicle speed V is equal to or higher than a threshold value V(2), and until a prescribed time period elapses from the time point of the IG OFF operation during running.

On the other hand, when the driver operates the brake pedal, when vehicle speed V has become lower than threshold V(2), or when the prescribed time period has elapsed, continuation determination unit 212 determines that the coasting state of vehicle 1 is not to be continued. It is noted that threshold value V(2) may be a value the same as or different from threshold value V(1).

It is noted that, for example, when it is determined that the coasting state of vehicle 1 is to be continued, continuation determination unit 212 may turn on a continuation determination flag.

In the present embodiment, determination unit 202, stop permission determination unit 204, stop control unit 206, low-load control unit 208, MG control unit 210, and continuation determination unit 212 are each described as functioning as software implemented by execution by a CPU in ECU 200, of a program stored in a memory, however, they may be implemented by hardware. It is noted that such a program is mounted on a vehicle as recorded in a storage medium.

Figure 4:
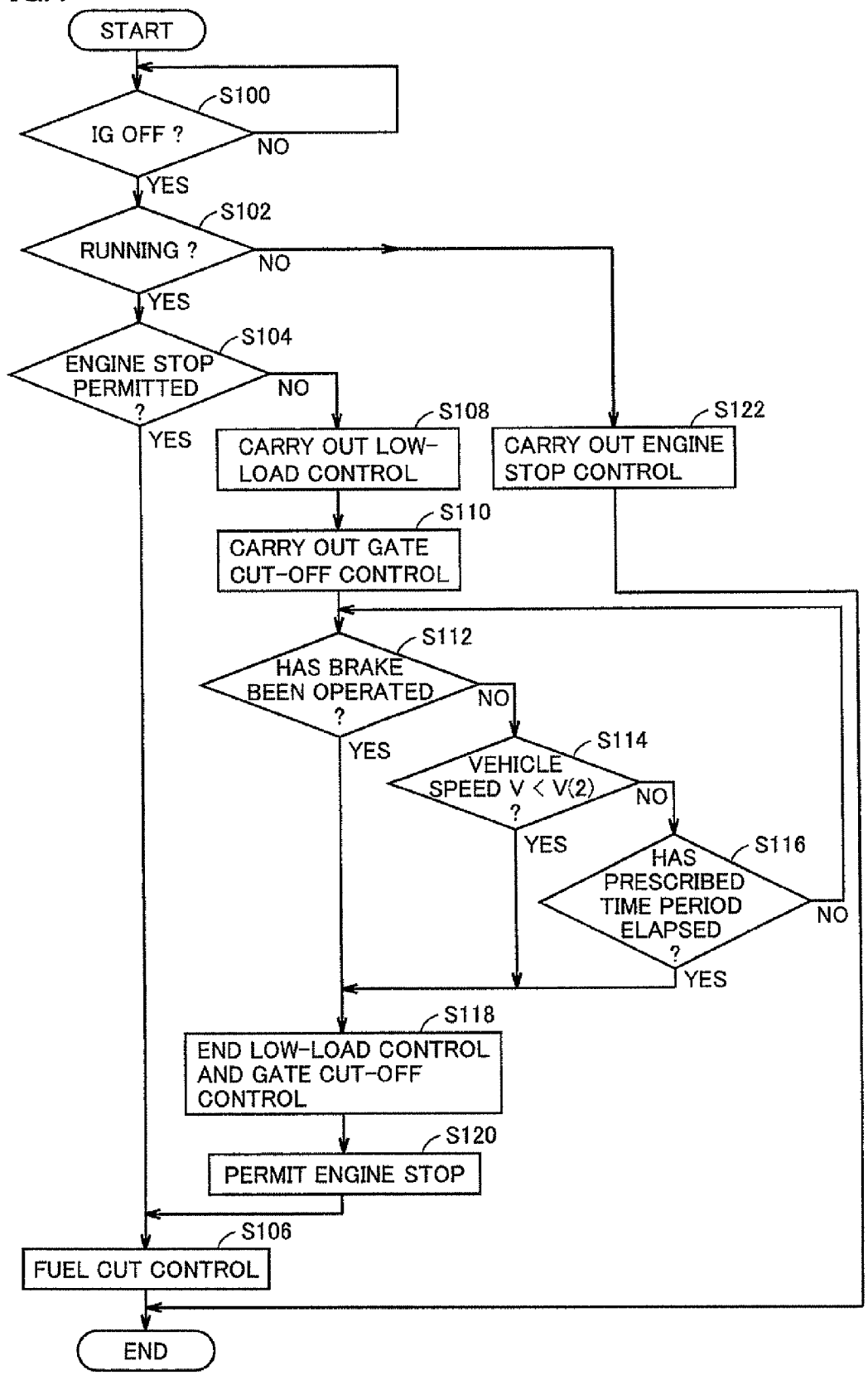
FIG. 4 is a flowchart of a program executed by the ECU mounted on the vehicle according to the present embodiment.

A control structure of a program executed by ECU 200 mounted on vehicle 1 according to the present embodiment will be described with reference to FIG. 4.

In step (a step will hereinafter be denoted as S) 100, ECU 200 determines whether or not an IG OFF operation has been performed. When the IG OFF operation has been performed (YES in S100), the process proceeds to S102. Otherwise (NO in S100), the process returns to S100.

In S102, ECU 200 determines whether or not vehicle 1 is running. When vehicle speed V of vehicle 1 is equal to or higher than prescribed vehicle speed V(0), ECU 200 determines that vehicle 1 is running. When vehicle 1 is running (YES in S102), the process proceeds to S104. Otherwise (NO in S102), the process proceeds to S122.

In S104, ECU 200 determines whether or not stop of engine 10 is permitted. When stop of engine 10 is permitted (YES in S104), the process proceeds to S106. Otherwise (NO in S104), the process proceeds to S108. Since the method for determining whether or not stop of engine 10 is permitted is as described above, detailed description thereof will not be repeated.

In S106, ECU 200 carries out fuel cut control. In S108, ECU 200 carries out low-load control of engine 10. In S110, ECU 200 carries out control for cutting off the gate of the inverter connected to first MG 20 and the gate of the inverter connected to second MG 30, in connection with PCU 60.

In S112, ECU 200 determines whether or not the brake pedal has been operated. When the brake pedal has been operated (YES in S112), the process proceeds to S106. Otherwise (NO in S112), the process proceeds to S114.

In S114, ECU 200 determines whether or not vehicle speed V has become lower than threshold value V(2). When vehicle speed V is lower than threshold value V(2) (YES in S114), the process proceeds to S106. Otherwise (NO in S114), the process proceeds to S116.

In S116, ECU 200 determines whether or not a prescribed time period has elapsed since the time point of the IG OFF operation during running of vehicle 1. When the prescribed time period has elapsed (YES in S116), the process proceeds to S106. Otherwise (NO in S116), the process proceeds to S112.

In S118, ECU 200 ends low-load control and gate cut-off control. In S120, ECU 200 permits stop of engine 10. In S122, ECU 200 carries out stop control for stopping engine 10.

An operation of ECU 200 mounted on vehicle 1 according to the present embodiment based on the structure and the flowchart as above will be described with reference to FIG. 5.

Figure 5:
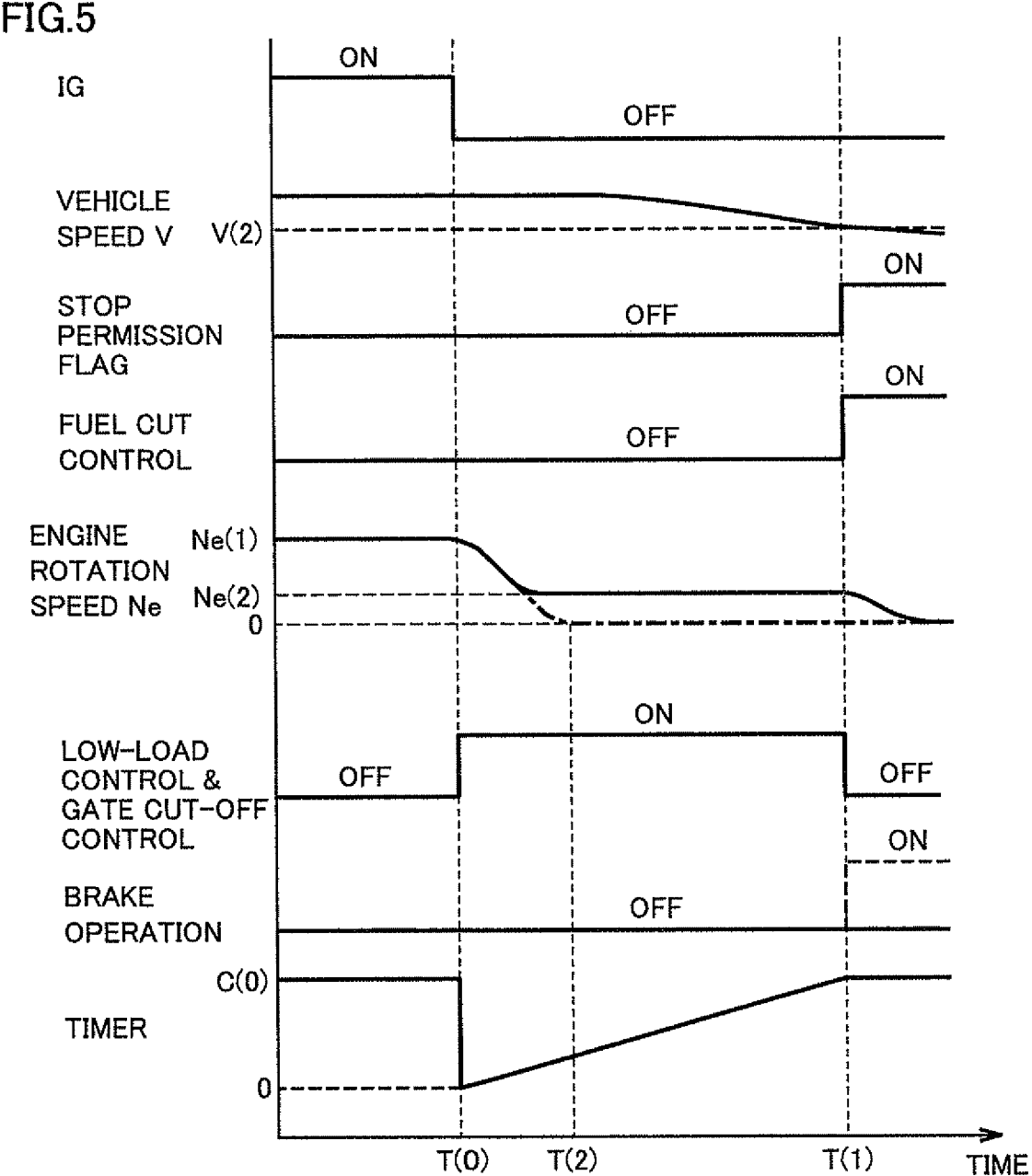
FIG. 5 is a diagram for illustrating an operation of the vehicle in the present embodiment.

As shown in FIG. 5, a case where an IG ON state is set (that is, a state where the system of vehicle 1 is active) and vehicle 1 is running is assumed. Here, it is assumed that engine 10 is operating and engine rotation speed Ne is set to Ne(1).

At time T(0), when the driver has performed the IG OFF operation (YES in S100) and when vehicle 1 is running (YES in S102), whether or not stop of engine 10 is permitted is determined (S104).

For example, when stop of engine 10 is not permitted (NO in S104) because vehicle speed V is equal to or higher than threshold value V(1), low-load control is carried out (S108). Therefore, engine rotation speed Ne lowers from Ne(1) to Ne(2). In addition, together with low-load control, gate cut-off control is carried out (S110). Consequently, vehicle 1 enters the coasting state. In addition, at time T(0), at the time point of the IG OFF operation by the driver, a timer count value is reset to an initial value (zero) and a prescribed value is added every calculation cycle.

At time T(1), for example, when the brake pedal is operated (YES in S112), when vehicle speed V has become lower than threshold value V(2) (YES in S114), or when a timer count value has reached C(0) corresponding to a prescribed time period (YES in S116), low-load control and gate cut-off control end (S118) and stop of engine 10 is permitted (S120). Therefore, fuel cut control is started (S106).

Though the time point of operation of the brake pedal, the time point when vehicle speed V has become lower than threshold value V(2), and the time point of lapse of the prescribed time period have been described as the same time point in FIG. 5 for the sake of convenience of illustration, in a case where the time points are different from one another, low-load control and gate cut-off control end at any earliest time point and stop of engine 10 is permitted.

At time T(0), when the driver has performed the IG OFF operation (YES in S100) and when vehicle 1 remains stopped (NO in S102), control for stopping engine 10 is immediately carried out (S122). Therefore, as shown with alternate long and short dashed lines in FIG. 5, fuel supply to engine 10 is stopped, and engine 10 is immediately stopped at time T(2).

Thus, a period from the time point of reception of the stop instruction by start switch 150 during running of vehicle 1 until start of stop control by ECU 200 (a period from time T(0) to time T(1)) is longer than a period in the case where start switch 150 receives the stop instruction while vehicle 1 remains stopped.

Namely, when start switch 150 receives the stop instruction during running of vehicle 1 while engine 10 is operating, ECU 200 delays start of stop control as compared with the case where start switch 150 receives the stop instruction while vehicle 1 remains stopped.

As above, according to the vehicle in the present embodiment, when start switch 150 receives the stop instruction during running of vehicle 1, start of control for stopping engine 10 is delayed as compared with the case where vehicle 1 remains stopped. Thus, when the IG ON operation is performed immediately after the IG OFF operation, the state of engine 10 can quickly be changed to the driver's intended state. Therefore, a vehicle and a control method for vehicle for controlling an engine to a restartable state in the case where an instruction for stopping the engine is received during running at a high speed can be provided.

In addition, in the case where stop of engine 10 is not permitted, for example, in the case where vehicle speed V is higher than threshold value V(1) or the like, once engine 10 is set to a stopped state, there is a case that it takes time to re-start engine 10 at the time when the IG ON operation is performed. Therefore, in the case where stop of engine 10 is not permitted, engine 10 is set to a state of self-sustained operation, so that the driver's re-start request can be met when the driver performs the IG ON operation.

In addition, when a prescribed time period has elapsed since the IG OFF operation, it can be estimated that the driver has an intention to stop vehicle 1. Therefore, in such a case, low-load control ends, stop of engine 10 is permitted, and fuel cut control is carried out, so that the state of engine 10 can be changed to the driver's intended state (a state where engine 10 is stopped).

Though ECU 200 in FIG. 1 has been described as a single ECU, two or more ECUs may be employed. For example, an operation of ECU 200 in FIG. 1 may be allocated to an engine ECU for controlling engine 10 and a hybrid ECU for controlling PCU 60.

Though vehicle 1 having drive wheel 80 as a front wheel has been shown by way of example in FIG. 1, the vehicle is not particularly limited to such a drive system. For example, vehicle 1 may have a rear wheel as a drive wheel. Alternatively, vehicle 1 may be a vehicle not including second MG 30 in FIG. 1. Alternatively, vehicle 1 may be a vehicle in which second MG 30 in FIG. 1 is coupled to a drive shaft for driving a rear wheel instead of drive shaft 16 of a front wheel. In addition, a speed change mechanism may be provided between drive shaft 16 and reduction gear 58 or between drive shaft 16 and second MG 30.

Figure 6:
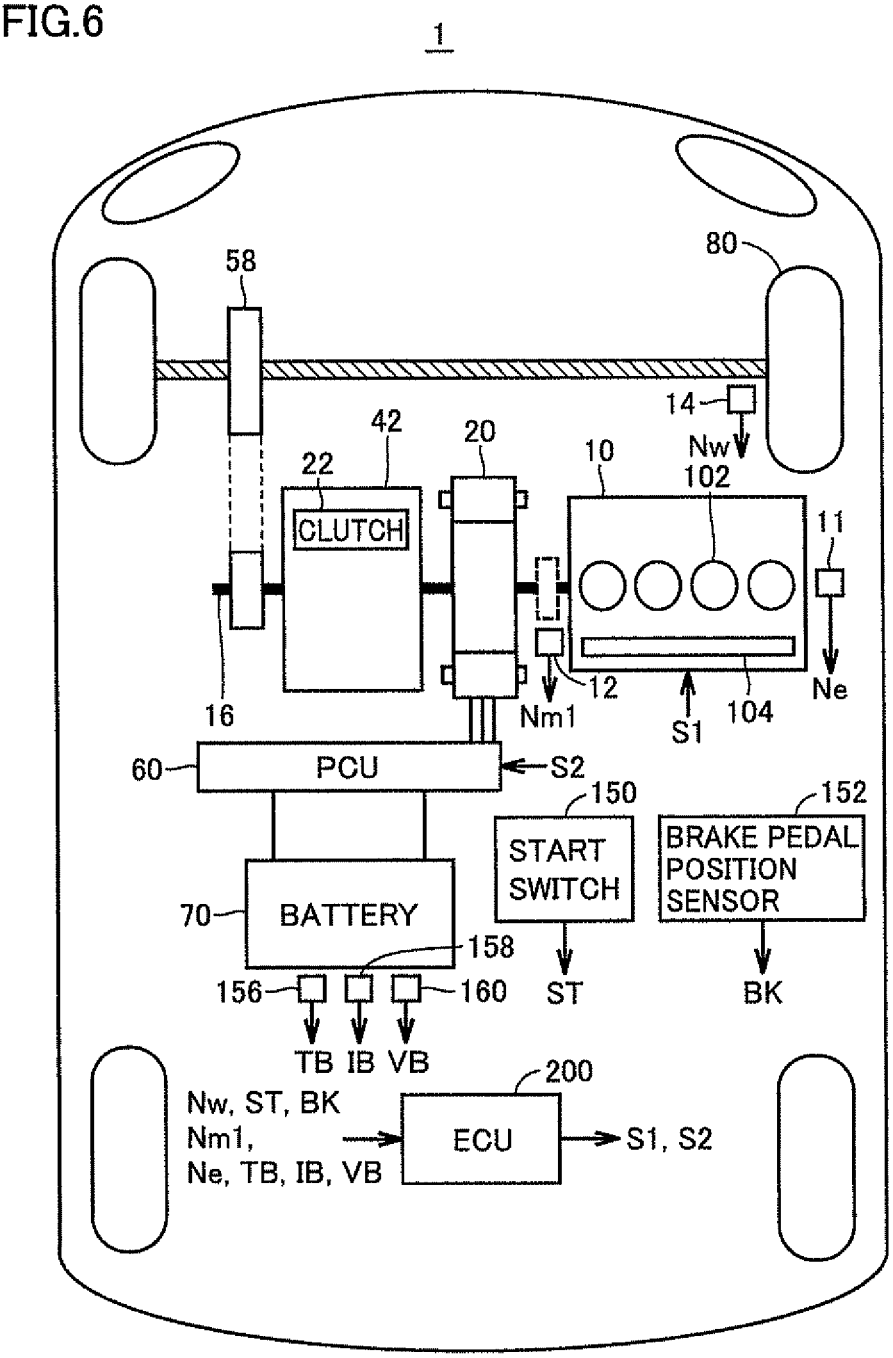
FIG. 6 is a diagram showing a configuration example of another vehicle.

Alternatively, vehicle 1 may have a configuration as shown in FIG. 6. Specifically, vehicle 1 shown in FIG. 6 is different from the configuration of vehicle 1 in FIG. 1 in not having second MG 30, having the rotation shaft of first MG 20 directly coupled to the output shaft of engine 10, and including a powertrain 42 having a clutch 22 instead of power split device 40. Clutch 22 switches between a motive power transmission state and a motive power cut-off state, between first MG 20 and drive wheel 80. Powertrain 42 represents, for example, a speed change mechanism. It is noted that a clutch (a dashed line in FIG. 6) may further be provided between engine 10 and first MG 20, in addition to clutch 22.

In such a vehicle 1, when start switch 150 receives a stop instruction during running of vehicle 1, a period from the time point of reception of the stop instruction until start of stop control may be longer than in the case where start switch 150 receives the stop instruction while vehicle 1 remains stopped. By doing so as well, an effect as in the case of FIG. 1 is exhibited.

Though the present embodiment has been described in which it is determined that stop of engine 10 is not permitted when input electric power allowed in battery 70 (that is, charge power upper limit Win) is lower than threshold value Win because of power generation by first MG 20 at the time of start of engine 10, for example, when first MG 20 discharges at the time of start of engine 10, it may be determined that stop of engine 10 is not permitted when output electric power allowed in battery 70 (that is, discharge power upper limit Wout) is lower than a threshold value Wout(0), for example, when first MG 20 discharges at the time of start of engine 10.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 vehicle; 10 engine; 11 engine rotation speed sensor; 12 first resolver; 13 second resolver; 14 wheel speed sensor; 16 drive shaft; 22 clutch; 40 power split device; 42 powertrain; 50 sun gear; 52 pinion gear; 54 carrier; 56 ring gear; 58 reduction gear; 70 battery; 80 drive wheel; 102 cylinder; 104 fuel injector; 150 start switch; 152 brake pedal position sensor; 156 battery temperature sensor; 158 current sensor; 160 voltage sensor; 200 ECU; 202 determination unit; 204 stop permission determination unit; 206 stop control unit; 208 low-load control unit; 210 MG control unit; and 212 continuation determination unit.

The invention claimed is:

1. A vehicle, comprising:
    a drive wheel;
    an internal combustion engine;
    a first rotating electric machine;
    a power transmission device for connecting said drive wheel, said internal combustion engine, and said first rotating electric machine to one another and transmitting motive power from at least any one of said internal combustion engine and said first rotating electric machine to said drive wheel;
    an input portion for receiving an instruction for stopping a system of the vehicle from a driver; and
    a control unit carrying out stop control for stopping fuel supply to said internal combustion engine in response to said instruction for stopping from said input portion while said internal combustion engine is operating,
    said control unit delaying start of said stop control in a case where said input portion has received said instruction for stopping during running of said vehicle, as compared with a case where said input portion receives said instruction for stopping while said vehicle remains stopped, and
    said control unit carrying out first control for setting said internal combustion engine to a low-load operation state and second control that said power transmission device does not transmit motive power from said internal combustion engine to said drive wheel when said vehicle is in such a state that it cannot permit stop of said internal combustion engine in a case where said input portion has received said instruction for stopping during running of said vehicle,
    wherein said control unit continues said first control and said second control until a prescribed period elapses after reception of said instruction for stopping by said input portion.

2. The vehicle according to claim 1, wherein
    said control unit determines that said vehicle is in the state that it cannot permit stop of said internal combustion engine when a speed of said vehicle is higher than a threshold value.

3. The vehicle according to claim 1, further comprising a power storage device for supplying and receiving electric power to and from said first rotating electric machine, wherein
    said control unit determines that said vehicle is in the state that it cannot permit stop of said internal combustion engine when state of charge of said power storage device is lower than a threshold value.

4. The vehicle according to claim 1, further comprising a power storage device for supplying and receiving electric power to and from said first rotating electric machine, wherein
    said control unit determines that said vehicle is in the state that it cannot permit stop of said internal combustion engine when input electric power allowed in said power storage device is lower than a threshold value.

5. The vehicle according to claim 1, further comprising a power storage device for supplying and receiving electric power to and from said first rotating electric machine, wherein
    said control unit determines that said vehicle is in the state that it cannot permit stop of said internal combustion engine when output electric power allowed in said power storage device is lower than a threshold value.

6. The vehicle according to claim 1, further comprising a drive shaft for rotating said drive wheel, wherein
    said power transmission device allows, by mechanically coupling three elements of said drive shaft, an output shaft of said internal combustion engine, and a rotation shaft of said first rotating electric machine and setting any one of said three elements as a reaction force element, transmission of motive power between two other elements, and
    said control unit controls as said first control, said first rotating electric machine such that said first rotating electric machine is set to an input and output disabled state.

7. The vehicle according to claim 6, further comprising a second rotating electric machine, wherein
    said control unit controls said second rotating electric machine such that said first rotating electric machine is set to said input and output disabled state and said second rotating electric machine is set to said input and output disabled state.

8. A control method for a vehicle including a drive wheel, an internal combustion engine, a first rotating electric machine, and a power transmission device for connecting said drive wheel, said internal combustion engine, and said first rotating electric machine to one another and transmitting motive power from at least any one of said internal combustion engine and said first rotating electric machine to said drive wheel, comprising the steps of:
    determining whether an instruction for stopping a system of the vehicle has been received from a driver;
    delaying start of stop control for stopping said internal combustion engine in a case where said instruction for stopping has been received during running of said vehicle while said internal combustion engine is operating, as compared with a case where said instruction for stopping is received while said vehicle remains stopped; and
    carrying out first control for setting said internal combustion engine to a low-load operation state and such second control that said power transmission device does not transmit motive power from said internal combustion engine to said drive wheel when said vehicle is in such a state that it cannot permit stop of said internal combustion engine in a case where said input portion has received said instruction for stopping during running of said vehicle,
    said stop control including control for stopping fuel supply to said internal combustion engine,
    wherein first control and said second control continue until a prescribed period elapses after reception of said instruction for stopping.

9. The vehicle according to claim 1, wherein
said control unit ends said first control and said second control when said brake pedal is operated before said prescribed period elapses.

* * * * *